(12) United States Patent
Downie et al.

(10) Patent No.: US 11,872,566 B2
(45) Date of Patent: Jan. 16, 2024

(54) MAGNETIC FILTER

(71) Applicant: ADEY HOLDINGS (2008) LIMITED, Cheltenham (GB)

(72) Inventors: Simon Downie, Cheltenham (GB); Kashem Pathan, Cheltenham (GB); Alan Ferry, Cheltenham (GB)

(73) Assignee: ADEY HOLDINGS (2008) LIMITED, Cheltenham (GB)

( * ) Notice: Subject to any disclaimer, the term of this patent is extended or adjusted under 35 U.S.C. 154(b) by 517 days.

(21) Appl. No.: 17/049,862

(22) PCT Filed: Apr. 17, 2019

(86) PCT No.: PCT/EP2019/059930
§ 371 (c)(1),
(2) Date: Oct. 22, 2020

(87) PCT Pub. No.: WO2019/206763
PCT Pub. Date: Oct. 31, 2019

(65) Prior Publication Data
US 2021/0069728 A1    Mar. 11, 2021

(30) Foreign Application Priority Data

Apr. 24, 2018   (GB) .................................... 1806632

(51) Int. Cl.
*B03C 1/28*    (2006.01)
*B01D 35/06*    (2006.01)
(Continued)

(52) U.S. Cl.
CPC .............. *B03C 1/288* (2013.01); *B01D 35/06* (2013.01); *C02F 1/482* (2013.01); *F24D 19/0092* (2013.01); *F28F 19/01* (2013.01); *B03C 2201/18* (2013.01); *B03C 2201/28* (2013.01); *C02F 2103/023* (2013.01); *F16C 1/04* (2013.01)

(58) Field of Classification Search
CPC ....... B03C 1/288; B03C 1/284; B03C 1/0332; B03C 2201/18; B03C 2201/28; B01D 35/06; C02F 1/482; C02F 2103/023; F24D 19/0092; F16C 11/04
See application file for complete search history.

(56) References Cited

U.S. PATENT DOCUMENTS 5,320,751 A    6/1994   Burns
5,510,024 A    4/1996   Caiozza
(Continued)

FOREIGN PATENT DOCUMENTS

CN    101925543 U    12/2010
CN    204029597 U    12/2014
(Continued)

*Primary Examiner* — Liam Royce
(74) *Attorney, Agent, or Firm* — Jacob M. Ward; Ward Law Office LLC

(57) ABSTRACT

A magnetic filter is disclosed suitable for use in large heating and/or cooling systems, for example heating systems using pipework between 2 inch bore and 4 inch bore. The magnetic filter includes a separation chamber in the form of a pipe, and externally-mounted magnetic 5 assemblies which are movable from a position close to the pipe to a position spaced from the pipe. The magnetic assemblies are pivotally mounted to the pipe via a framework.

13 Claims, 6 Drawing Sheets

(51) Int. Cl.
  *C02F 1/48* (2023.01)
  *F28F 19/01* (2006.01)
  *F24D 19/00* (2006.01)
  *F16C 11/04* (2006.01)
  *C02F 103/02* (2006.01)
  *F16C 1/04* (2006.01)

(56) References Cited

U.S. PATENT DOCUMENTS

| | | | |
|---|---|---|---|
| 5,714,063 | A | 2/1998 | Brunsting |
| 5,817,233 | A | 10/1998 | Cooper |
| 9,458,702 | B1 | 10/2016 | Derouen, Sr. |
| 2001/0013491 | A1 | 8/2001 | Kaske |
| 2008/0149549 | A1* | 6/2008 | Lee .................. B03C 1/288 210/223 |
| 2014/0263077 | A1 | 9/2014 | Lombardi et al. |
| 2016/0074782 | A1 | 3/2016 | Gunasekera |

FOREIGN PATENT DOCUMENTS

| | | | |
|---|---|---|---|
| CN | 204719463 U | 10/2015 | |
| CN | 204723879 U | 10/2015 | |
| CN | 206816936 U | 12/2017 | |
| DE | 202005015060 U1 * | 1/2006 | ............ B01D 27/00 |
| DE | 202005015060 U1 | 1/2006 | |
| FR | 2766390 | 1/1999 | |
| GB | 2491246 A | 11/2012 | |
| GB | 2537152 A | 10/2016 | |
| GB | 2551828 A | 1/2018 | |
| GB | 2561760 A | 10/2018 | |
| JP | 62126296 U | 8/1987 | |
| JP | 2001038361 A | 2/2001 | |
| JP | 2004017022 A | 1/2004 | |
| JP | 2016206507 A | 12/2016 | |
| KR | 1020120127837 | 11/2012 | |
| WO | 9903680 A1 | 1/1999 | |
| WO | 0003951 | 1/2000 | |
| WO | 2016162670 A1 | 10/2016 | |

* cited by examiner

MAGNETIC FILTER

CROSS-REFERENCE TO RELATED APPLICATIONS

This patent application is a United States National Stage of International Patent Application No. PCT/EP2019/059930, filed on Apr. 17, 2019, which in turn claims priority to Great Britain Patent Application No. 1806632.4, filed on Apr. 24, 2018. The entire disclosures of the above patent applications are incorporated herein by reference.

TECHNICAL FIELD

The present invention relates to a magnetic filter, in particular a magnetic filter suitable for use in a large commercial central heating or cooling system.

BACKGROUND TO THE INVENTION

It is now common to fit magnetic filters in wet central heating systems. A magnetic filter improves the performance of the system by attracting and retaining magnetic particles, removing them from the system water and preventing damage to heat exchangers, pumps, and other components which are vulnerable to damage caused by particles within the heating fluid. These magnetic filters also find applications in other types of closed loop water systems, including cooling and chilling systems.

For domestic central heating systems, magnetic filters are generally provided in the form of a chamber, often made from plastics, with an inlet and an outlet and a magnet within the chamber. An example of this type of magnetic filter is disclosed in GB2491246. This type of filter is typically available in 22 mm and 28 mm sizes which are the most common pipe bores in domestic central heating systems.

Larger systems, for example in commercial buildings, often use 2 inch (around 50 mm) or greater diameter pipe. Filters are available for these larger systems, for example the filters sold by the applicant under the trade mark "Magnaclean® Commercial". These filters are in the form of a large, heavy, cast container, with an inlet or outlet on either side, a removable lid, and magnets extending into the chamber. These filters are however expensive to manufacture, and there is a need for a lower-cost alternative.

"Large systems" include 2 inch, 2.5 inch, 3 inch, 4 inch, 6 inch and 8 inch pipe bores. Many different sizes of filter therefore need to be provided to cover the range of large heating systems and this further adds to product cost.

It has been proposed in GB2551828 to make a filter in the form of a pipe having an inlet and outlet section, and a wider-diameter filtration section in between the inlet and the outlet. Magnetic elements are provided on the outside of the pipe, surrounding the filtration section. However, manufacturing tolerances can prevent the magnets from making good contact, leading to unsatisfactory performance. Furthermore, manufacturing the filtration section of the pipe with flat sections is costly.

When magnetic debris builds up within the filter, a force exists urging the magnetic elements towards the filter body. To clean the filter, the magnetic elements have to be moved away from the filter body against this force, which can be difficult. A screw thread is envisaged in GB2551828 to provide a mechanical advantage and make this possible, but it means that the process of moving the magnetic elements away from the filter body is time consuming.

It is an object of the present invention to solve the above mentioned problems.

SUMMARY OF THE INVENTION

According to a first aspect of the present invention, there is provided a magnetic filter for a central heating and/or cooling system, the magnetic filter comprising a chamber having an inlet and an outlet, and a movable magnetic assembly adapted to be movable from a position close to an outside wall of the chamber to a position spaced from the outside wall of the chamber, the movable magnetic assembly including an elongate carrier having a longitudinal centreline, and including a plurality of magnet pairs disposed along the carrier, each magnet pair having a first magnet on one side of the centreline and a second magnet on the other side of the centreline, the first and second magnets of each magnet pair being joined to each other by a bar passing across the centreline and the bar being movable relative to the carrier on a pivot, in which the pivot corresponding with at least one of the magnet pairs is offset from the centreline to one side, and the pivot corresponding with at least one other of the magnet pairs is offset from the centreline to the other side.

In the configuration with the magnetic assembly positioned close to the outside wall of the chamber, the magnets are preferably in contact with the outside wall of the chamber. In the configuration with the magnetic assembly spaced from the chamber, the magnets may be, for example, a few centimetres from the chamber wall. Only a short spacing is required to dramatically decrease the magnetic attraction between the magnets and magnetic particles inside the chamber, to allow captured magnetic debris to be drained out.

A drain port may be provided in the chamber.

In use, the magnetic assembly is positioned close to or against the outside wall of the chamber. Central heating/cooling system water flows through the chamber during operation of the system, and any magnetic particles which may be entrained within the system water will be attracted by the magnets and held inside the chamber, against the wall of the chamber. At some point the magnetic debris will need to be cleaned out. This may be done by isolating the filter from the heating/cooling circuit, moving the magnetic assembly to the position spaced from the chamber, and then opening the drain port in the chamber to drain fluid and magnetic particles out of the chamber. It may sometimes be preferable to reconnect one of the inlet and outlet to the central heating/cooling circuit for a short period of time while the drain port remains open, to flush through the filter and remove any further debris.

Ideally, the inlet and outlet of the filter are connected to the system circuit via valves, making the isolation and reconnection procedure very straightforward. This can be arranged using readily-available off-the-shelf valve components with suitable fittings to match the filter and the system circuit.

The magnetic assembly having magnet pairs with pivots offset to different sides assists when the magnetic assembly has to be moved away from the body of the filter for cleaning. As force is applied to pull the magnetic assembly away from the chamber, the magnet pairs will pivot so that one magnet of each pair pulls away from the filter body slightly before the other magnet of the pair. This makes it easier to overcome the magnetic attraction between the magnets and magnetic debris captured inside the filter.

Preferably, all of the pivots are offset. More preferably, about half of the pivots are offset to one side and about half of the pivots are offset to the other side. In the case where the total number of pivots on a carrier is even, it will be possible and desirable for exactly half the pivots to be offset to one side and exactly half the pivots to be offset to the other side. Where the total number of pivots is odd, the number of pivots offset to each side will not be quite equal.

Preferably, the offset of the pivots alternates along the magnetic assembly. In this way, the force caused by the magnetic attraction between the magnets remaining close to the chamber wall and the debris within the chamber will be reduced in a relatively uniform way along and across the magnetic assembly as the magnetic assembly is pulled away from the chamber wall.

Preferably, the magnet pairs are spring-loaded towards the chamber. To achieve this, a spring may be provided between the magnet pair and part of the structure of the carrier running behind the magnet pair, i.e. on the side of the magnet pair facing away from the chamber in use.

The springs ensure good close contact between the magnets and the outside wall of the chamber, even given possible imperfections in the surface profile of the chamber wall.

Preferably, the carrier includes a force transfer element disposed between the bar of the magnet pair and the chamber wall, the force transfer element being rigidly attached to the rest of the carrier. The force transfer element acts to move the magnets away from the chamber by exerting a force onto the front of the bar and hence to the magnet pair, i.e. pushing the magnet pair from the side facing towards the chamber. This avoids loading the springs when pulling the carrier away from the chamber. Therefore, the springs used may be thin leaf springs, since they are never subject to large loads. The only purpose of the springs is to urge the magnets against the chamber wall in use and ensure good contact.

The centreline of the carrier is central in that it is provided substantially centrally between the two magnets of each magnet pair. It may not be central relative to the overall structure of the carrier. Indeed, some embodiments may have two or more rows of magnet pairs and therefore two or more centrelines on a single magnetic assembly.

The chamber may be substantially cylindrical, having a curved outer wall. In this case, the magnetic assembly is preferably curved and disposed around the curved outer wall of the chamber when in position close to the chamber. The centreline of the carrier in this case is curved, preferably in the shape of an arc of a circle.

Preferably, the magnetic filter includes multiple magnetic assemblies, each magnetic assembly being individually movable between a position close to the chamber and a position spaced from the chamber. In one embodiment, each magnetic assembly is substantially a half-circle. Two half-circle assemblies may be provided extending from a common pivot in opposing directions. The two half-circle assemblies may form substantially a full circle when in the position close to the chamber. The two half-circle assemblies may encircle and surround the chamber.

Preferably, the magnetic assembly/ies are spring loaded into the position spaced from the chamber and may be retained against the spring by retaining means when the assembly/ies are in the position close to the chamber.

In a preferred embodiment, each assembly is joined to the body of the filter by a pivot at one end of the carrier. When in position close to the filter chamber, the assembly is retained at the other end of the carrier against the action of the spring. Preferably the spring loading is achieved my means of a torsion spring at the pivot point.

A stop may be provided to limit the extent to which the magnetic assembly may be moved away from the chamber. Where the assembly moves by pivoting from one end of the carrier, the stop may be provided in the form of an extension of the carrier which extends from the pivot point in the opposite direction to the greater length of the carrier. As the carrier moves away from the chamber on the pivot, the stop will move towards the chamber until it comes into contact with the chamber, preventing further movement of the carrier. The stop, in combination with a torsion spring on the pivot, provides an easy to use magnetic assembly which moves reliably into the position spaced from the chamber. Because the assembly is magnetic, and because embodiments may include multiple magnetic assemblies, and also because there may be significant magnetic attraction to debris within the filter, unrestricted movement of carriers may be problematic and unsafe.

According to a second aspect of the invention, there is provided a magnetic filter for a central heating and/or cooling system, the magnetic filter comprising a chamber having an inlet and an outlet, and an elongate magnetic assembly, the elongate magnetic assembly being mounted to the outside of the chamber on a pivot disposed near to one end of the elongate magnetic assembly, a major length of the elongate magnetic assembly being movable from a position close to the chamber to a position spaced from the chamber by pivoting the magnetic assembly on the pivot, and a minor length of the elongate magnetic assembly extending from the pivot point in a direction opposite to the direction of the major length, the minor length forming a stop for contacting the chamber when the major length of the elongate magnetic assembly is spaced from the chamber, to prevent further movement of the major length of the magnetic assembly away from the chamber.

Preferably, the magnetic assembly may be spring-loaded into the position where the major length is spaced from the chamber. In one embodiment, the spring-loading is provided by means of a torsion spring at the pivot point.

Further optional features of the second aspect of the invention are set out in claims 17 to 22. Embodiments of the second aspect of the invention may also share features of embodiments of the first third and fourth aspects of the invention.

According to a third aspect of the invention, there is provided a magnetic filter for a central heating and/or cooling system, the magnetic filter comprising a chamber having an inlet and an outlet, and a magnetic assembly mounted to the outside of the chamber, the magnetic assembly being movable from a position close to an outside wall of the chamber to a position spaced from the outside wall of the chamber, the magnetic assembly comprising:

a carrier;

at least one magnetic element mounted to the carrier on the side of the carrier facing towards the chamber;

at least one spring disposed between the carrier and the magnetic element(s) for urging the magnetic element(s) towards the chamber; and at least one force transfer element rigidly fixed to the carrier and disposed in front of part of the or each magnetic element, for pushing on the magnetic element(s) from the side of the magnetic element(s) facing towards the chamber, to apply force to the magnetic element(s) in a direction away from the chamber, when the magnetic assembly is moved to a position spaced from the outside wall of the chamber.

Preferably the spring is a leaf spring. In one embodiment, the spring has apertures in the side of the spring facing towards the chamber, and protrusions in the back of the magnetic element locate within the apertures. The magnetic element may be in the form of a pair of magnets joined by a bar. The force transfer element may extend in front of (i.e. on the side facing the chamber) the bar, between the two magnets. In this way the force transfer element may push on the magnetic element from the side facing the chamber, but at the same time the magnets themselves are not obstructed by the force transfer element and so can be disposed very close to, preferably in contact with, the outside wall of the chamber when the magnetic assembly is in its position close to the chamber.

Further optional features of the third aspect of the invention are set out in claims 28 to 39. Embodiments of the third aspect of the invention may also share features of embodiments of the first second and fourth aspects of the invention.

According to a fourth aspect of the invention, there is provided a magnetic filter for a central heating and/or cooling system, the magnetic filter comprising:

a chamber in the form of a substantially cylindrical pipe having an inlet and an outlet at either end of the pipe;

a framework fixed to the outside of the pipe, the framework including a bar running along the outside of the pipe, substantially parallel to the pipe;

and at least one elongate curved magnetic assembly which is pivotally mounted to the bar on a pivot disposed near to one end of the magnetic assembly, a major length of the elongate magnetic assembly being movable from a position close to the chamber to a position spaced from the chamber by pivoting the magnetic assembly on the pivot.

In most embodiments, it is envisaged that multiple pivotable magnetic assemblies will be provided along the bar. The magnetic assemblies may include an aperture. To assemble the magnetic filter, a single bar may be passed through the apertures in a plurality of magnetic assemblies, and the bar may then be fixed to the rest of the framework and hence fixed to the magnetic filter.

Advantageously, magnetic filters of different sizes may be assembled from a stock of a small number of different components. It is envisaged that magnetic filters suitable for heating/cooling systems ranging from 2 inch to 4 inch bore may use a chamber in the form of a pipe having the same diameter, with only the inlet and outlet and associated connections differing for the different sized systems. Larger systems will have a larger flow rate through the filter, and will need more magnetic elements to ensure effective capture performance. However, all framework and magnetic assembly components may be common to all sizes in a range, apart from potentially the bars which could be provided in multiple different lengths. Because the magnetic filter is assembled in a modular way, assembling a filter for a larger system simply involves mounting a greater number of magnetic assemblies onto a bar.

As an example, the outside diameter of the separation chamber may be six inches for all variants, suitable for systems of 2 inch, 2.5 inch, 3 inch, or 4 inch bore. A filter for a 2 inch or 2.5 inch system may have for example three magnetic assemblies, or three pairs of magnetic assemblies, mounted to the framework. A filter for a 3 inch system may have four magnetic assemblies or four pairs of magnetic assemblies, and a filter for a 4 inch system may have five magnetic assemblies or five pairs of magnetic assemblies. In all cases, the separation chamber is identical, and the construction of the magnetic assemblies is identical. The construction of the framework will only differ in terms of the length of the bar. The bar is a very straightforward component which is inexpensive to manufacture in multiple lengths.

To make a range of four different filters therefore, the stock of different components, and the tooling costs associated with manufacture, are reduced to a minimum.

Further optional features of the fourth aspect of the invention are set out in claims 43 to 46. Embodiments of the fourth aspect of the invention may also share features of embodiments of the first second and third aspects of the invention.

DESCRIPTION OF THE DRAWINGS

For a better understanding of the invention, and to show more clearly how it may be carried into effect, preferred embodiments will now be described with reference to the accompanying drawings, in which.

DESCRIPTION OF THE PREFERRED EMBODIMENTS

Figure 1:
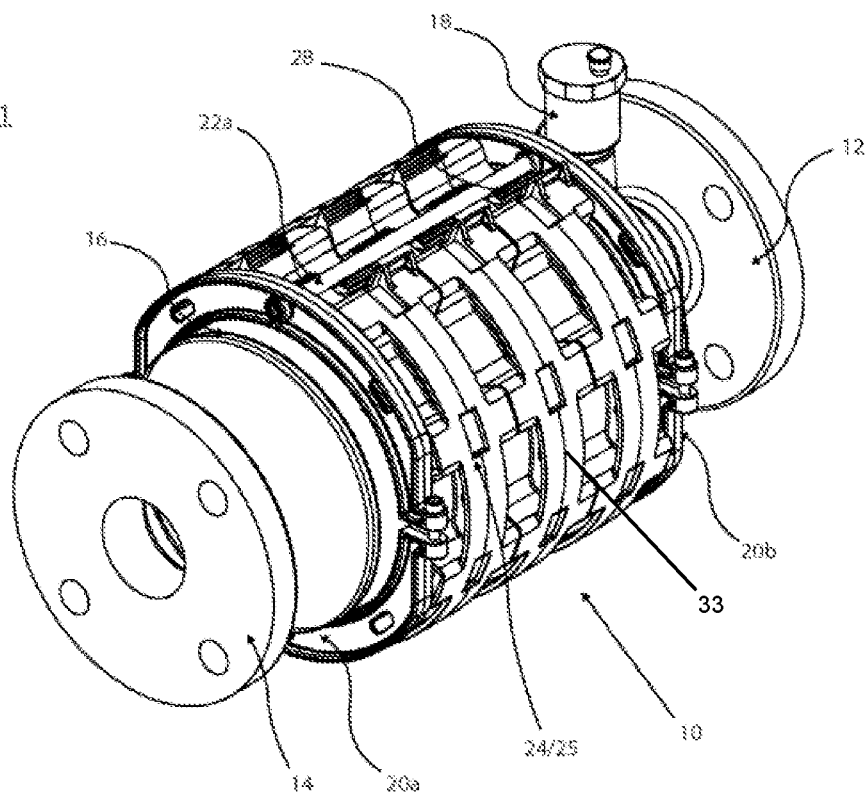
FIG. 1 is a perspective view of a magnetic filter according to the invention, having multiple magnetic assemblies all of which are shown in a closed position close to the main body of the filter.

Referring firstly to FIG. 1, a magnetic filter is indicated generally at 10. The magnetic filter 10 includes a separation chamber 16 which is in the form of a cylindrical pipe. The pipe is approximately 6 inches (15.24 cm) in diameter. The separation chamber includes an inlet interface 12 in the form of an opening and a flange, and an outlet interface 14 in the form of a similar opening and flange. The inlet and outlet in this embodiment are substantially identical and are interchangeable.

It is envisaged that multiple versions of the filter may be produced for use with different heating or cooling systems. For example, systems having pipework with 2 inch, 2.5 inch, 3 inch or 4 inch bore. In each case, the inlet and outlet interfaces will include appropriately-sized flanges and openings. The same separation chamber however may be used for all variants, with only the inlet and outlet on the ends being modified.

The magnetic filter includes an automatic air vent 18 for bleeding air from the filter 10. As an alternative, a manual air release valve may be included instead. A drain port (not visible in the figures) may also be provided in some embodiments.

Figure 3:
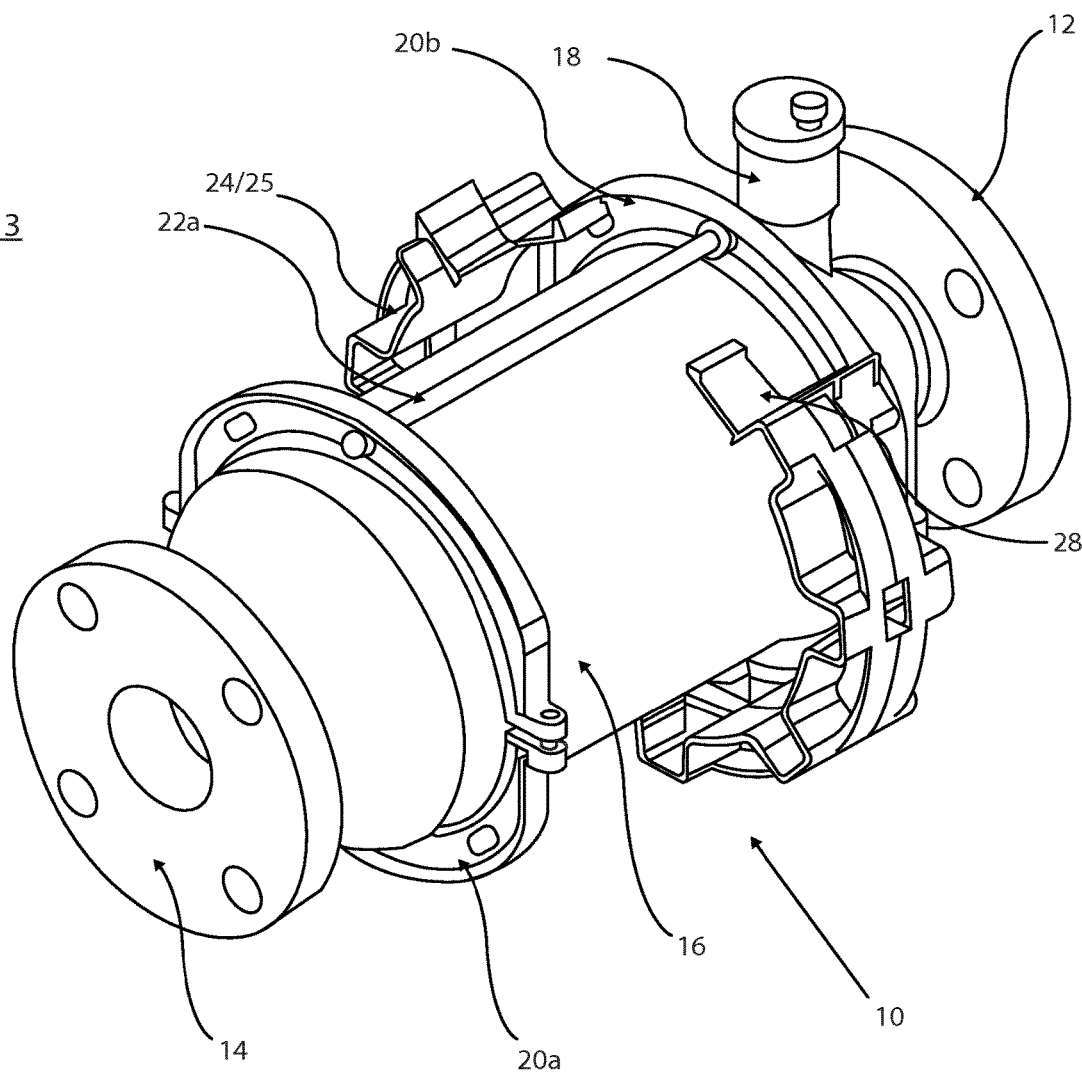
FIG. 3 is another perspective view of the magnetic filter of FIG. 1, having two magnetic assemblies which are both shown in an open position spaced from the main body of the filter.

As best seen in FIG. 3, a framework is provided on the outside of the separation chamber 16. The framework includes two two-part clamps 20a, 20b. Each two-part clamp has two substantially semi-circular pieces, which can be fixed to each other with screws and tightened in order to fix the clamp substantially around the circumference of the separation chamber 16. The two parts of the clamp may be substantially identical in form, so that four identical pieces are used to make the two two-part clamps of the filter.

The framework further includes a pair of bars 22a, 22b. The bars extend along the outside of the separation chamber 16, spaced slightly from the outside surface of the separation chamber, and are held in place by the clamps 20a, 20b. As seen best in the cross-section in FIG. 2, the bars are positioned at opposite points around the circumference of the separation chamber 16. The bars 22a, 22b may be held in place on the clamps 20a, 20b by, for example, a screw passing through the clamp and into a tapped hole on either end of each bar 22a, 22b, or by blind holes in the clamps to receive the ends of the bars so that the bars are retained between the two clamps as long as the clamps remain fixed in place to the separation chamber 16.

Figure 2:
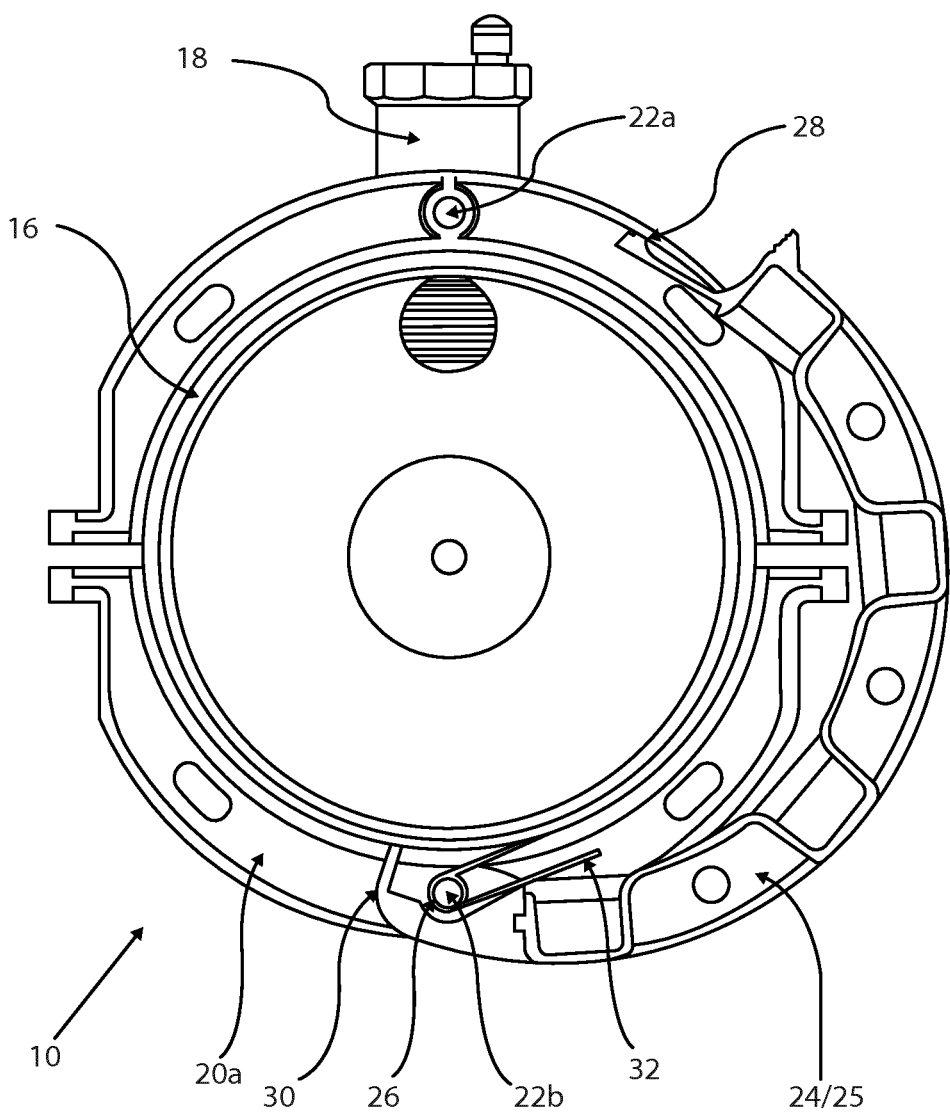
FIG. 2 is a cross section through the magnetic filter of FIG. 1, having a single magnetic assembly fitted which is shown in an open position spaced from the main body of the filter.

A plurality of magnetic assemblies 24 are attached to the magnetic filter 10 via the framework 20, 22. Each magnetic assembly is individually movable from a position close to the separation chamber 16 (all the magnetic assemblies in FIG. 1) to a position spaced from the separation chamber 16 (FIG. 2 and FIG. 3). The manner in which the magnetic assemblies are attached to and interact with the filter 10 is best illustrated in FIG. 2.

Note that in FIG. 2, only a single magnetic assembly is shown for clarity. However, it is envisaged that most embodiments would have multiple magnetic assemblies. All of the multiple magnetic assemblies in this embodiment are identical.

FIG. 2 and FIG. 3 show partially-assembled filters. It is envisaged that the space between the clamps 20a, 20b will always be filled with magnetic assemblies, and the magnetic assemblies will be provided in pairs to fully surround the separation chamber. Where a smaller number of magnetic assemblies are required for smaller heating systems, the space between the clamps 20a, 20b will be reduced.

The magnetic assembly 24 includes a curved elongate carrier 25. The shape of the magnetic assembly 24 is substantially semi-circular, to match the profile of the outside surface of the separation chamber 16. An aperture 26 is provided through the carrier 25, near to one end of the carrier. The magnetic assembly 24 is mounted to the framework by passing one of the bars 22b of the framework through the aperture. The magnetic assembly 24 may then pivot on the bar 22b, from a position close to/against the separation chamber 16 (FIG. 1) to a position spaced from the separation chamber 16 (FIG. 2).

At the opposite end of the carrier 25 from the aperture 26, a resilient clip 28 is provided. The resilient clip 28 extends from the end of the carrier 25 as a leaf terminating in a catch. The resilient clip 28 is preferably formed integrally with the rest of the carrier which is made from a resilient plastics material. The leaf of the resilient clip 28 extends between the separation chamber 16 and the bar 22a, and the catch of the resilient clip 28 holds the carrier 25 in place in the closed position (see FIG. 1). To release the carrier 25 and move it to the open position, spaced from the carrier, the resilient clip 28 may be pushed towards the separation chamber 16 so that the catch moves clear of the bar and the clip may be released.

In this embodiment, the width of the catch 28 (in the direction into/out of the drawing in FIG. 2—the direction along the length of the filter 10) is around half the width of the rest of the carrier 25, or just less than half the width. There is also a half width section at the other end of the carrier 25, where the aperture 26 is provided. This allows two carriers 24 to be fixed to the bar 22b, and to be retained in the closed position by the bar 22a, in the same axial position along the filter 10. Two semi-circular carriers in combination substantially surround the filter in a full circle. This is best illustrated in FIG. 3.

At the end of the carrier 25 which has the aperture 26, a small extent of the carrier 25 is on the opposite side of the pivot to the majority of the extent of the carrier 25. This small extension (30, FIG. 2) forms a stop. As the carrier 25 is pivoted into the open position, where the major extent of the carrier 25 is spaced from the separation chamber 16, the stop 30 moves towards the separation chamber 16, until the stop 30 comes into contact with the separation chamber 16. At this point, the major part of the carrier 25 cannot move any further away from the separation chamber 16, since the stop 30 is preventing further pivoting.

A torsion spring 32 is provided at the pivot, for biasing the carrier 25 into the open position. The torsion spring 32 is preferably sufficiently strong that the carriers 24 are held in the open position whatever the orientation of the filter. For example, if the filter is oriented 90 degrees or 180 degrees from the position shown in FIG. 2, the torsion spring 32 will hold the carriers in the open position, against gravity. When the carriers 24 are in the closed position, the resilient clips 28 keep the carriers in the closed position, preventing the springs from moving the carriers to the open position.

Figure 6:
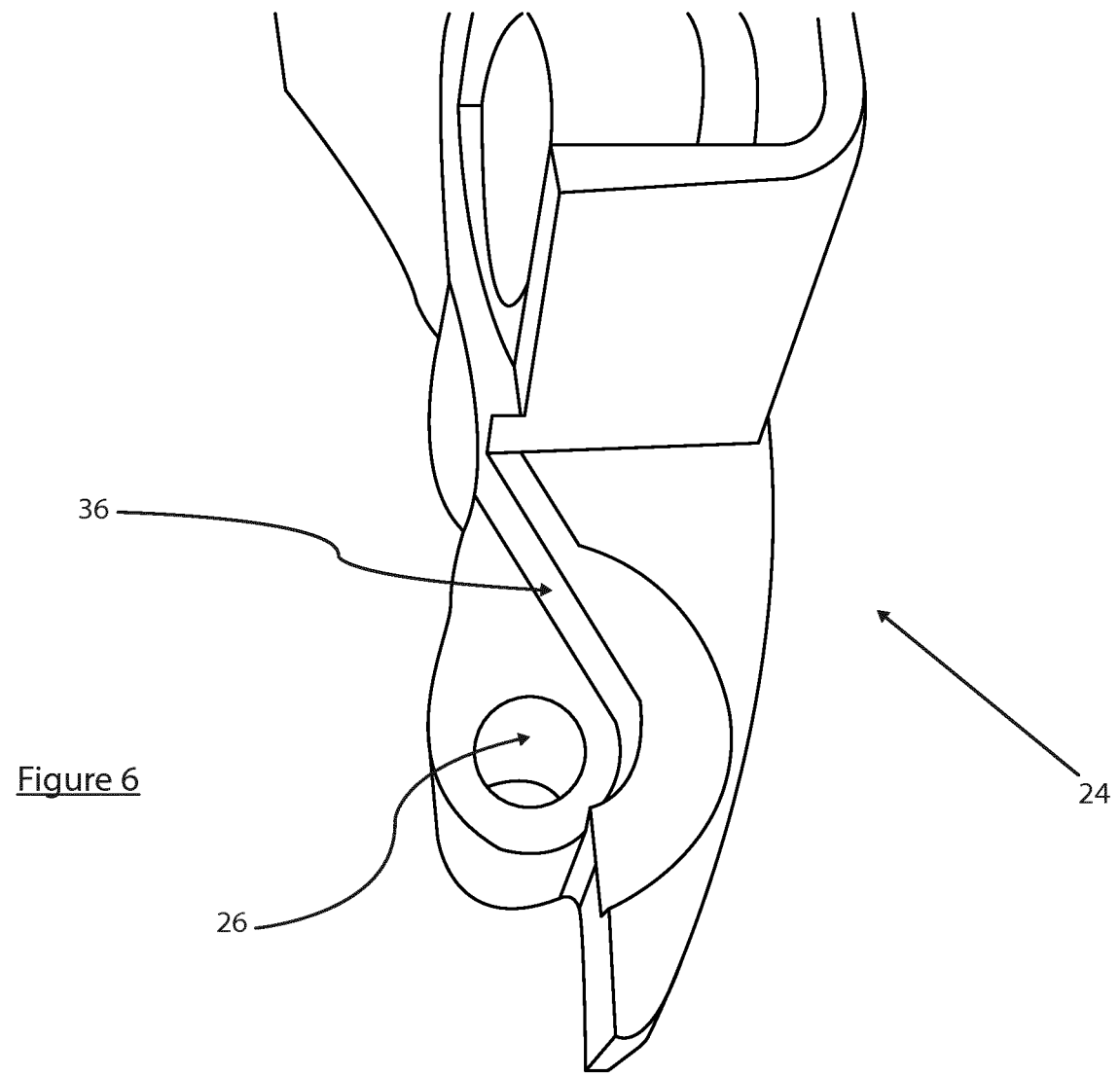
FIG. 6 is a perspective view showing another detail of the magnetic assembly of FIG. 5, specifically a pivot point of the magnetic assembly.

The torsion spring 32 is in the form of a coil wound around the bar 22b (in practice the coil is pre-wound and slid over the bar 22b during assembly), with two arms extending from the coil. The arms contact on the one hand the outside surface of the separation chamber 16, and on the other hand the side of the carrier 25 which faces the separation chamber. As seen in FIG. 6, the carrier 25 may include a formation 36 for bearing against an arm of the spring 32.

The arrangement of the carriers on the framework allows filters of different sizes to be made from a stock of a small number of different parts. To make a filter suitable for a 2 inch, 2.5 inch, 3 inch or 4 inch system a common separation chamber in the form of a pipe of about 6 inches diameter may be used. The two-part clamps forming the framework are the same for all sizes of filter, although are spaced apart by different distances on installation to the separation chamber, depending on the number of carriers to be installed. The bars forming the rest of the framework will need to be provided in different lengths, but these are simple parts. The carriers are identical, with only the number of carriers fitted changing for filters suitable for differently-sized systems.

Figure 4:
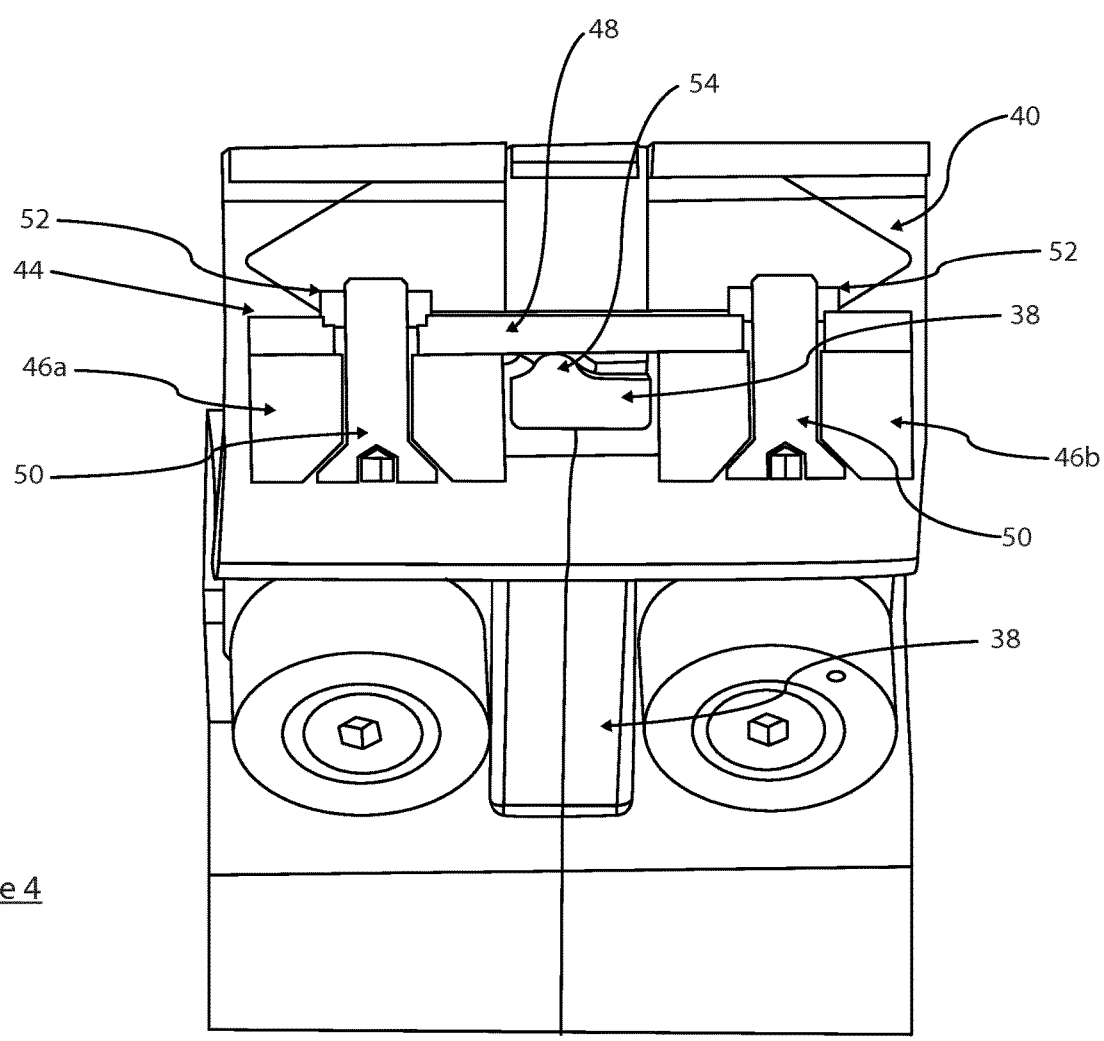
FIG. 4 is a cross section through a magnetic assembly, forming part of the magnetic filter of FIG. 1.
Figure 5:
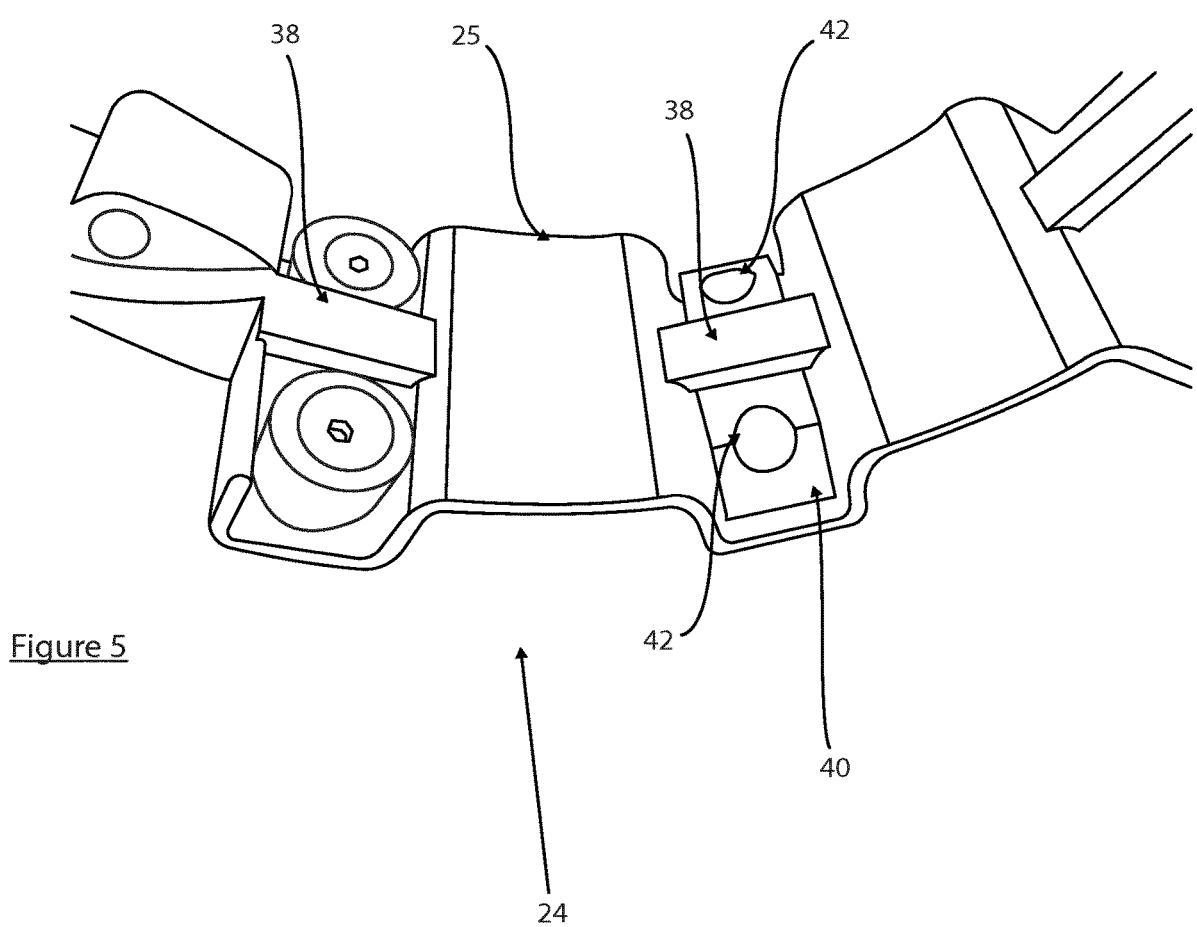
FIG. 5 is a perspective view showing a detail of a partially-assembled magnetic assembly, forming part of the magnetic filter of FIG. 1.

Referring now to FIG. 4 and FIG. 5, the arrangement of the magnetic assemblies 24 will be described in more detail. The main structure of the magnetic assembly is the carrier 25 which is made from a slightly resilient plastics material. The magnetic assembly 24 shown in FIG. 5 is partially assembled and is seen looking towards the side which faces the separation chamber (16) when the magnetic assembly 24 is assembled to the filter (10). The carrier 25 includes a number of recesses for receiving magnet pairs. In FIG. 5, there are two recesses visible in full, and one recess partially visible to the right of the drawing. As seen best in FIG. 2, there are a total of four recesses for receiving magnet paid in each magnetic assembly 24.

Each recess in the carrier extends substantially across the width of the carrier, and has open sides. A force transfer element 38 in the form of a bar passes substantially centrally across the recess, in the direction of the length of the carrier. The force transfer element 38 is formed integrally with the carrier 25. There is a space between the force transfer element 38 and the back of the carrier (the back being the side of the carrier which faces away from the separation chamber when assembled).

A leaf spring 40 passes between the force transfer element 38 and the back of the carrier. The leaf spring 40 has two leaves, one on either side of the force transfer element 38 when fitted. Each leaf has a through aperture 42. The arrangement is seen in perspective in FIG. 5 and in cross section in FIG. 4.

A magnet pair 44 is then installed and is held between the spring 42 and the force transfer element 38. In FIG. 5, the recess on the left hand side has a spring 42 and magnet pair 44 in it. The recess on the right has only been partially completed so that the spring 42 is visible.

The magnet pair 44 comprises a pair of substantially cylindrical magnetic billets 46a, 46b. Each magnetic billet has a north pole at one end of the cylinder and a south pole at the other end of the cylinder. The billets are assembled to a ferromagnetic bar 48, with the north pole of one billet and the south pole of the other billet being in contact with the bar 48. The billets 46a, 46b and ferromagnetic bar 48 together act like a horseshoe magnet.

The magnetic billets 46a, 46b may be fixed to the bar by bolts 50. Nuts 52, preferably clinch nuts, may be provided on the other side of the bar to accept the bolts. The nuts 52 may conveniently locate in the apertures 42 through the leaves of the spring 40.

When assembled, as best seen in FIG. 4, the force transfer element 38 which is integral with the carrier 25 runs substantially perpendicular to and in front of the ferromagnetic bar 48. The ferromagnetic bar 48 sits between the force transfer element 38 and the spring 40. The spring 40 urges the magnet pair 44 towards the separation chamber. The force transfer element 38 runs between the two magnetic billets 46a, 46b, and so, although the force transfer element 38 acts on the magnet pair 44 via the ferromagnetic bar 48, it does not obstruct the magnetic billets 46a, 46b. With the magnetic assembly 24 in the closed position, the magnetic billets 46a, 46b are in contact with an outside surface of the separation chamber 16.

On a back surface of the force transfer element 38—i.e. the surface of the element facing away from the separation chamber—a pivot 54 is provided. The pivot is an integral extension from the back surface of the force transfer element 38 which allows the magnet pair 44 to "rock". The pivot 54 is offset from the centreline 33 between the two magnetic billets. In FIG. 4, the visible pivot 54 is offset slightly to the left as viewed in the drawing. Just below the visible pivot in FIG. 4, there is another similar arrangement of a magnet pair although the pivot is not visible because it is hidden behind the force transfer element 38. The pivot in this arrangement is offset to the right. Preferably, the offset of pivots alternates along the magnetic assembly 24. The magnetic assembly 24 in this embodiment has four recesses, four springs, and four magnet pairs. Two of the pivots are therefore offset to the one side and two of the pivots are offset to the other side.

The offset pivots are advantageous when the magnetic assembly 24 is being moved from a position against the separation chamber 16 to a position spaced from the separation chamber 16. As force is applied to pull the magnetic assembly 24 away from the separation chamber, against magnetic attraction between the magnetic billets 46a, 46b and magnetic debris which may be within the separation chamber, the magnet pairs will tend to pivot so that only the magnetic billet which in each case is further from the pivot remains in contact with the separation chamber. When this happens, the magnetic attraction is reduced since half as many magnets are in contact with the separation chamber, and fully pulling the magnetic assembly away from the separation chamber becomes much easier.

When the magnetic assembly 24 is pulled away from the separation chamber, force is transferred from the carrier 25 to the magnet pairs via the contact of the force transfer element 38 which is integral with the carrier 25 and the ferromagnetic bar 48 which forms part of the magnet pair 44. No force at all is transferred through the spring 40. The spring is relatively light-duty, its purpose being purely to ensure good contact of the magnetic billets 46a, 46b with the separation chamber 16, irrespective of possible surface imperfections on the separation chamber 16.

The magnetic filter described provides a high performance filter at low cost, which is easy to use. A range of filters can be made for a range of differently sized systems, using a stock of a small number of different parts.

The invention claimed is:

1. A magnetic filter for a central heating and/or cooling system, the magnetic filter comprising:
   a chamber having an inlet and an outlet, and a movable magnetic assembly adapted to be movable from a position close to an outside wall of the chamber to a position spaced from the outside wall of the chamber, the movable magnetic assembly including an elongate carrier having a longitudinal centerline, and including a plurality of magnet pairs disposed along the carrier, each magnet pair having a first magnet on one side of the centerline and a second magnet on the other side of the centerline, the first and second magnets of each magnet pair being joined to each other by a bar passing across the centerline and the bar being movable relative to the carrier on a pivot, in which the pivot corresponding with at least one of the magnet pairs is offset from the centerline to one side, and the pivot corresponding with at least one other of the magnet pairs is offset from the centerline to the other side.

2. The magnetic filter of claim 1, wherein a direction of offset of the pivots alternates along the magnetic assembly, a pivot offset to one side of the centerline having adjacent pivot(s) offset to the other side of the centerline.

3. The magnetic filter of claim 1, wherein the magnet pairs are spring-loaded towards the chamber.

4. The magnetic filter of claim 3, wherein a spring is provided between each magnet pair and part of the structure of the carrier running behind the magnet pair.

5. The magnetic filter of claim 1, wherein a force transfer element is disposed between part of the magnet pair and the separation chamber, the force transfer element being rigidly attached to the rest of the carrier and configured to transfer force between the magnetic element and the carrier.

6. The magnetic filter of claim 1, wherein the chamber is cylindrical, having a curved outer wall.

7. The magnetic filter of claim 6, wherein the magnetic assembly is curved, having a curved centerline.

8. The magnetic filter of claim 7, wherein the centerline is in the shape of an arc of a circle.

9. The magnetic filter of claim 1, wherein multiple magnetic assemblies are provided.

10. The magnetic filter of claim 9, wherein each magnetic assembly is individually movable between a position close to the chamber and a position spaced from the chamber.

11. The magnetic filter of claim 9, wherein each magnetic assembly is joined to a body of the filter by a pivot near one end of the carrier.

12. The magnetic filter of claim 11, wherein a stop is provided to limit an extent to which the magnetic assembly is pivoted away from the carrier.

13. The magnetic filter of claim 12, wherein the stop is in the form of an extension of the carrier which extends from the pivot point in an opposite direction to an greater length of the carrier.

* * * * *